S. DIOLOT.
Ornamental Chains for Necklaces, &c.

No. 155,430. Patented Sept. 29, 1874.

WITNESSES:

INVENTOR:

BY

ATTORNEYS.

UNITED STATES PATENT OFFICE.

SAINTEMME DIOLOT, OF NEW YORK, N. Y.

IMPROVEMENT IN ORNAMENTAL CHAINS FOR NECKLACES, &c.

Specification forming part of Letters Patent No. 155,430, dated September 29, 1874; application filed July 3, 1874.

*To all whom it may concern:*

Figure 1:
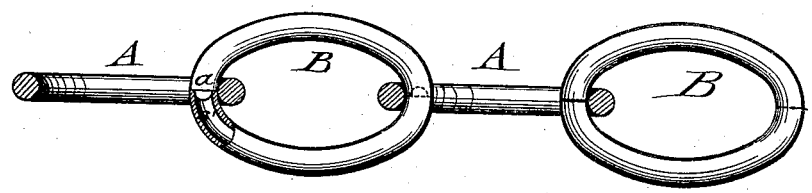
Figure 2:
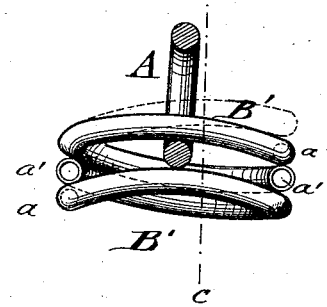
Figure 3:
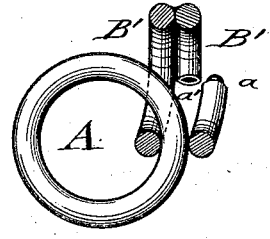

Be it known that I, SAINTEMME DIOLOT, of the city, county, and State of New York, have invented a new and Improved Chain for Necklaces, &c., of which the following is a specification:

In the accompanying drawing, Figure 1 represents a sectional side elevation of my improved chain for necklaces and other articles of jewelry; Fig. 2, a side view of the spring-link, showing mode of applying closed links or rings; and Fig. 3, a vertical transverse section of the spring-link on the line $c\ c$, Fig. 2.

Similar letters of reference indicate corresponding parts.

The object of my invention is to produce a chain for necklaces and other articles of jewelry, which is formed of alternating solid closed links and open spring-links, in such a manner that the mode of joining is hardly perceptible, and thereby the appearance of the chain considerably enhanced.

My invention consists in a chain constructed of alternating closed rings or links and opening spring-links, the latter being made of two separate links, soldered or otherwise attached to each other at one side, so that the free ends of both links join by their spring action at opposite sides into the socket-shaped connecting ends, and admit thereby the ready inserting of the closed links.

A in the drawing represents the closed link or ring, being hollow or solid, and of gold or any other suitable material. B is the spring-link, which forms, with the alternating links A, a chain for necklaces and other purposes, being made of gold or other suitable metal, and either hollow or solid, as desired. The spring-link B is composed of two separate links, B′, of equal size, which are soldered or otherwise connected along one side in such a manner that the points of the links B′ are at opposite points from each other. The point of each link B′ is produced by providing one end with a projecting semicircular head, $a$, and the other end with a corresponding recess, $a'$. The spring action of the free parts of the links B′ admits the ready opening and reclosing of their jointed ends, so that the closed links A may be introduced into them and the link-joints closed, and thereby the appearance of a solid link produced.

This gives the necklace and other articles made with such links a more finished and ornamental appearance, especially as in most cases the link-joints are not perceptible, being covered by the closed links.

Having thus described my invention, I claim as new and desire to secure by Letters Patent—

1. An ornamental chain for necklaces or other articles of jewelry, composed of alternate closed links or rings A and double-jointed spring-links B, constructed and arranged substantially as described.

2. The spring-link B for chains, necklaces, &c., formed of two equal links, B′, connected at one side and having their joints opposite, arranged substantially as described, so that the spring action of their free ends allows the ready opening and closing of the joints, for the insertion of the alternate closed links.

SAINTEMME DIOLOT.

Witnesses:
T. B. MOSHER,
ALEX. F. ROBERTS.